April 16, 1963
R. D. STACKHOUSE
3,085,317
COATED GRAPHITE BODIES
Filed Dec. 31, 1959
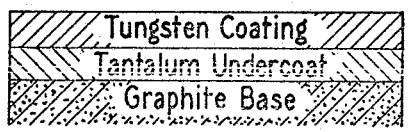
INVENTOR.
ROBERT D. STACKHOUSE
BY Richard S. Shreve
ATTORNEY 3,085,317
COATED GRAPHITE BODIES
Robert D. Stackhouse, Indianapolis, Ind., assignor to Union Carbide Corporation, a corporation of New York
Filed Dec. 31, 1959, Ser. No. 863,128
6 Claims. (Cl. 29—183.5)

This invention relates to coated graphite bodies which are resistant to damage caused by high temperature oxidation and flame erosion.

More particularly, it relates to graphite bodies having tungsten-containing refractory outer coatings and tantalum intermediate coatings.

There is a need in industry for materials that can withstand severe high temperature conditions. In particular, the aircraft and missile industries require items such as rocket nozzles that are resistant to rapid disintegration caused by high temperature thermal shock and/or flame erosion. Attempts have been made in the past to meet these requirements by constructing the nozzles of graphite to take advantage of its good high temperature properties. These prior articles failed under test conditions principally because the graphite did not have the ability to withstand the severe erosion created by extremely hot combustion gases impinging upon and traveling along the exposed surfaces.

A further attempt at solving the high temperature problem has been to coat the graphite nozzle with a heat barrier such as alumina or zirconia. These prior coated nozzles failed under test conditions because the oxide coating would spall off due to thermal shock and thus would expose the base material to severe high temperature erosion conditions.

Still another attempt has been made by applying a metal undercoat between the oxide outer layer and the nozzle. This combination can withstand some thermal cycling without spalling off the coating, but the oxide layer can be readily damaged by high temperature flame erosion.

It is accordingly an object of this invention to provide a novel coated graphite body having improved resistance to high temperature oxidation and flame erosion.

It is a further object to provide such an article wherein the graphite base has a plurality of coatingsg thereon.

The objects of this invention are accomplished in general by providing a graphite body member with an arc-plated tantalum undercoating and an arc-plated refractory outer coating containing tungsten. The tantalum coating should have a minimum thickness of about 0.001 inch with a preferred minimum thickness of about 0.003 inch. No upper limit for the undercoat layer thickness for this application is known but it is preferred that a maximum thickness of about 0.010 inch be used. The tungsten-containing outer layer can be of any desired thickness but is preferably at least about 0.020 inch thick. In addition to straight tungsten, other useful outer layers of the present invention are tungsten containing about 10 weight percent zirconia, tungsten containing about 3 weight percent chromium, and tungsten containing about 25 weight percent molybdenum.

Both the tantalum undercoat and the tungsten-containing outer layer should be applied by a high velocity arc-heated coating process in order to obtain desirable coating characteristics of good bond strength and low porosity without seriously affecting the graphite base material. If the coatings are applied by electroplating, for example, the electrolyte solution is undesirably absorbed by the graphite. Various flame-type coating processes are also unsatisfactory since they tend to oxidize the tantalum and the tungsten during coating application. It is preferred that an arc process such as that described in U.S. Patent No. 2,858,411 be used as the heat source for applying the novel coating combination of the present invention.

While the invention is not intended to be limited hereby, the following theory is thought to provide an explanation for the improved results obtained by this combination coated body. The tungsten-containing outer layer is quite resistant to high temperature flame erosion but often has a tendency to spall off from the graphite base material due to differences in thermal expansion. The tantalum undercoat is a good thermal conductor and acts to remove heat rapidly from the tungsten-containing outer layer and conduct it to the graphite. This tends to protect the outer layer as well as to even out the heat transfer to the graphite and decrease overall thermal shock. The relatively high melting point of tantalum enables it to maintain its bond strength at high temperatures. Tantalum also has a higher coefficient of expansion and ductility than tungsten which is beneficial in maintaining a good bond between the tungsten and the graphite under the thermal stresses prevalent, for example, in a rocket nozzle. Tantalum is further especially useful in that the tantalum-carbon system which may form at the undercoat-graphite interface has relatively high melting point. This also tends to maintain the bond strength at high temperature. The overall result is that the combination coated body has a desirably long operating life under severe service conditions.

However, it is to be understood that under very severe service conditions even the tungsten-containing outer protective layer and the tantalum undercoat may be destroyed. In such event, however, the graphite base will have been sufficiently protected so that it will stand up for the designed operating life. Rocket nozzles, for example, are intended to have an operating life of about 120 seconds. Unprotected graphite nozzles fail due to severe erosion and oxidation within 30 seconds. The novel coated graphite combination of the present invention has stood up to the high velocity, high temperature rocket nozzle conditions for the desired operating life.

The FIGURE shown in the drawing illustrates an article of the invention.

The following examples describe the production of coated graphite body combinations which have utility in resisting high temperature flame and oxidation erosion.

EXAMPLE I

Tantalum and Tungsten Coatings on Graphite

An arc of 60 volts and 200 amperes was maintained between a 1/8-in. dia. tungsten stick cathode and a water-cooled copper nozzle anode having a 1/8-in. dia. nozzle passage. Argon at 150 c.f.h. passed along the tungsten cathode and out through the nozzle passage. An additional 150 c.f.h. argon stream containing 30 grams/min. tantalum powder (—325 mesh) was introduced below the tip of the tungsten cathode and passed through the arc and out through the nozzle. An additional 30 c.f.h. nitrogen shielding gas stream surrounded the effluent from the torch. The hot gas-tantalum particle effluent was impinged on a graphite workpiece to form a dense adherent coating of tantalum 0.002–0.004 in. thick. The tantalum powder was then replaced with tungsten powder to form a 0.030 in. thick outer layer on the tantalum-coated graphite.

A graphite rocket nozzle coated with tantalum and tungsten in a manner similar to that described above was tested under actual rocket firing conditions and satisfactorily stood up under the high temperature flame erosion and thermal shock environment.

EXAMPLE II

*Tantalum and Tungsten-Molybdenum Coatings on Graphite*

Equipment of the type described in Example I above was used. The arc power was 200 amperes and 56 volts. Argon at 162 c.f.h. passed along the tungsten cathode and out through the nozzle passage. An additional 132 c.f.h. argon stream containing 30 grams/min. tantalum powder was introduced below the tip of the tungsten cathode and passed through the arc and out through the nozzle. A 30 c.f.h. nitrogen shielding gas stream surrounded the effluent from the torch. The hot gas-tantalum particle effluent was impinged on a graphite rocket nozzle to form a dense adherent coating of tantalum 0.003-in. thick. The tantalum powder was then replaced with tungsten powder containing 25 weight percent molybdenum to form a 0.065-in. thick outer layer on the tantalum-coated graphite.

This coated body combination is also useful in high temperature environments.

What is claimed is:

1. A high temperature flame erosion resistant article comprising a graphite body member having an arc-plated tantalum coating thereon at least 0.001-in. thick and an outer arc-plated tungsten-containing coating.

2. A high temperature flame erosion resistant article comprising a graphite body member having an arc-plated tantalum coating thereon at least 0.001-in. thick and an outer arc-plated tungsten coating.

3. A high temperature flame erosion resistant article comprising a graphite body member having an arc-plated tantalum coating thereon at least 0.001-in. thick and an outer arc-plated coating of tungsten containing about 10 weight percent zirconia.

4. A high temperature flame erosion resistant article comprising a graphite body member having an arc-plated tantalum coating thereon at least 0.001-in. thick and an outer arc-plated coating of tungsten containing about 3 weight percent chromium.

5. A high temperature flame erosion resistant article comprising a graphite body member having an arc-plated tantalum coating thereon at least 0.001-in. thick and an outer arc-plated coating of tungsten containing about 25 weight percent molybdenum.

6. A high temperature flame erosion resistant article comprising a graphite body member having an arc-plated tantalum coating thereon about 0.003–0.010-in. thick and an outer arc-plated tungsten containing coating at least about 0.020-in. thick.

References Cited in the file of this patent

UNITED STATES PATENTS

| 1,162,149 | Eckhardt | Nov. 30, 1915 |

FOREIGN PATENTS

| 226,459 | Switzerland | July 16, 1943 |
| 171,420 | Austria | May 26, 1952 |